United States Patent [19]
Mamin et al.

[11] Patent Number: 5,497,359
[45] Date of Patent: Mar. 5, 1996

[54] OPTICAL DISK DATA STORAGE SYSTEM WITH RADIATION-TRANSPARENT AIR-BEARING SLIDER

[75] Inventors: Harry J. Mamin, Palo Alto; Daniel Rugar, Los Altos; Bruce D. Terris, Sunnyvale, all of Calif.

[73] Assignee: National Business Machines Corporation, N.Y.

[21] Appl. No.: 297,994

[22] Filed: Aug. 30, 1994

[51] Int. Cl.[6] .................................................... G11B 7/12
[52] U.S. Cl. .................. 369/44.15; 369/44.14; 369/112; 369/44.16
[58] Field of Search ................ 369/97, 96, 44.14, 369/44.12, 44.15, 44.16, 44.19, 44.21, 44.22, 109, 112

[56] References Cited

U.S. PATENT DOCUMENTS

| | | | |
|---|---|---|---|
| 5,105,403 | 4/1992 | Kando et al. | 369/44.12 |
| 5,105,408 | 4/1992 | Lee et al. | 369/44.15 |
| 5,121,256 | 6/1992 | Corle et al. | 359/664 |
| 5,125,750 | 6/1992 | Corle et al. | 359/819 |
| 5,150,338 | 9/1992 | Birecki et al. | 369/13 |
| 5,214,630 | 5/1993 | Goto et al. | 369/112 X |

FOREIGN PATENT DOCUMENTS

| | | |
|---|---|---|
| 0409468A2 | 1/1991 | European Pat. Off. . |
| 5-73980 | 3/1993 | Japan . |
| 5-174410 | 7/1993 | Japan . |

OTHER PUBLICATIONS

Davidson, "Aplanatic Microlenses and Applications in the Semiconductor Industry", SPIE, vol. 1926, 1993, pp. 84–91.
Hurst, Jr., et al., "Optical Recording at 2.4 Gbit/in$^2$ Using a Frequency Doubled Diode Laser", Japanese Journal of Applied Physics, vol. 32, 1993, pp. 5301–5306.
Lean, "Flying Optical Head for Disc Applications", IBM Technical Disclosure Bulletin, vol. 23, No. 7A, Dec. 1980, pp. 2994–2995.
Mansfield et al., "Solid Immersion Microscope", Applied Physics Letters, vol. 57, No. 24, 10 Dec. 1990, pp. 2615–2616.
Mansfield et al., "High–numerical–aperture Lens System for Optical Storage", Optics Letters, vol. 18, No. 4, Feb. 15, 1993, pp. 305–307.
Nishihara et al., "Integrated–optic Disc Pickups", Optical Data Storage, SPIE vol. 1663, 1992, pp. 26–36.
Yasukawa et al., "A New Flying Optical Head", Japanese Journal of Applied Physics, vol. 28, Supplement 28-3, 1989, pp. 205–208.

Primary Examiner—Georgia Y. Epps
Assistant Examiner—Muhammad N. Edun
Attorney, Agent, or Firm—Thomas R. Berthold

[57] ABSTRACT

An optical disk drive has an air-beating slider formed of transparent material and located adjacent the surface of the optical disk. In the manner of conventional magnetic disk drives, the slider is maintained in close relationship with the disk surface by an air-bearing generated by the rotating disk and the shape of the slider's air-bearing surface (ABS). The slider has a lens section located on its back side opposite the side with the ABS. In the preferred embodiment the lens section is at least a hemisphere and the lens section and slider are formed of the same material and thus have the same index of refraction, n. The lens section and slider are transparent to light from the disk drive's light source and together form a super-hemispherical solid immersion lens (SIL). The slider's ABS is maintained within one wavelength of the surface of the optical disk. The light from the disk drive's light source is focused by the super-hemispherical SIL to a point on the slider ABS. The light is coupled through the air-bearing gap via the evanescent field to the data layer on the optical disk. The focused spot size on the disk data layer is thus reduced by a factor of $n^2$ from what it would otherwise be without the super-hemispherical SIL provided by the lens section and transparent slider.

39 Claims, 5 Drawing Sheets

OPTICAL DISK DATA STORAGE SYSTEM WITH RADIATION-TRANSPARENT AIR-BEARING SLIDER

TECHNICAL FIELD

This invention relates generally to optical disk data storage systems, and more specifically to such a system using a solid immersion lens to reduce the size of the light beam at the data layer on the disk.

BACKGROUND OF THE INVENTION

Optical disk data storage systems provide the capability to store large quantities of data on a disk. The data is accessed by focusing a laser beam onto the data layer of the disk and then detecting the reflected light beam. Various kinds of systems are known. In a ROM (Read Only Memory) system, such as a compact disk system (CD-ROM), data is permanently embedded as marks in the disk at the time of manufacture of the disk. The data is detected as a change in reflectivity as the laser beam passes over the data marks. A WORM (Write-Once Read-Many) system allows the user to write data by making marks, such as pits, on a blank optical disk surface. Once the data is recorded onto the disk it cannot be erased. The data in a WORM system is also detected as a change in reflectivity. There are also erasable optical data storage systems, such as phase change and magneto-optic (M-O) systems. While phase change systems also read data by sensing a change in reflectivity, M-O systems read data by measuring the rotation of the incident polarization caused by the M-O media. In all of these systems the focusing lens for the optical beam is located away from the disk.

The data density in optical disk drives is determined by the size of the recorded marks or pits on the disk, which is limited by the diameter of the focused laser spot on the disk. This spot size is the same as the diameter of the focused optical beam, also called the beam waist size. The waist size of a focused light beam is given approximately by $\lambda/2NA$, where $\lambda$ is the wavelength and NA-$n\sin\theta$ is the numerical aperture of the lens. The waist size can be reduced by either using shorter wavelength lasers, such as blue lasers, or by employing higher NA lenses.

Figure 1A:
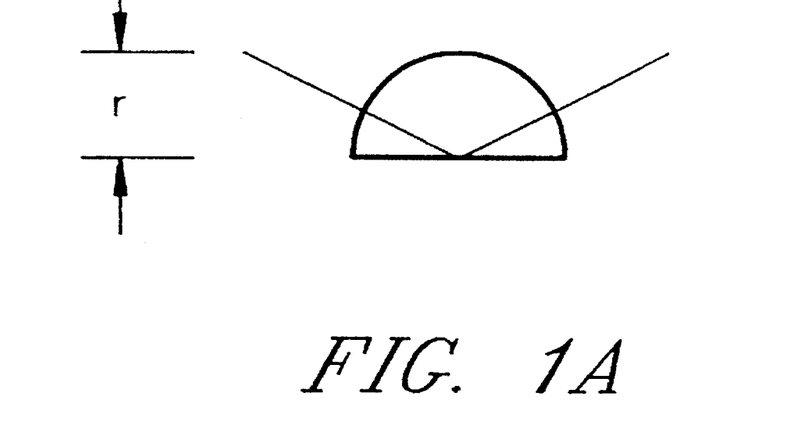
FIG. 1A is a diagram of a hemisphere solid immersion lens (SIL) with a thickness r.

One approach to achieving a high NA lens is to use a lens of high index of refraction (n) material and to position the lens close to the recording layer on the disk. Such a high NA lens is a solid immersion lens (SIL) which is made in the shape of a hemisphere and is described by S. M. Mansfield et al., *Optics Lett.*, vol. 18, p. 305, 1993. As shown in FIG. 1A, the hemispherical SIL has a thickness r, where r is the radius of the sphere. An air gap separates the flat surface of the hemispherical SIL and the surface of the optical disk. The NA is increased by a factor of n due to the wavelength reduction in the lens.

U.S. Pat. No. 5,125,750 proposes an optical disk drive with a conical section of a hemispherical SIL supported on a conventional air-beating slider of the type used in magnetic recording disk drives. The conical section of the hemispherical SIL is held within the slider by springs so that the flat surface of the SIL faces the disk surface. Because this approach is limited to using only a small conical section of a hemisphere as the SIL, the realizable NA and thus the spot size is severely limited. This approach has the additional disadvantage that there is no continuous air-bearing surface (ABS) on the slider because the SIL projects through the slider body with the flat surface of the SIL forming part of the ABS. It is therefore difficult to make the flat surface of the hemispherical SIL so that it is in exactly the same plane as the ABS. If the SIL protrudes through the ABS the slider will not fly properly and the SIL will touch the disk, damaging both the disk and the SIL. If the SIL is recessed from the ABS by even a fraction of a wavelength, the optical resolution will be degraded.

Figure 1B:
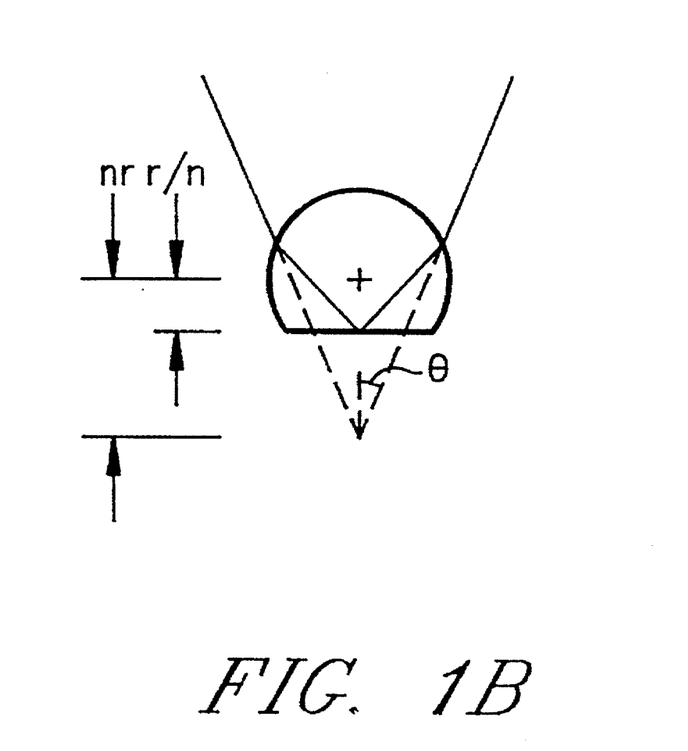
FIG. 1B is a diagram of a super-hemispherical SIL with a thickness r(1+1/n).

Another type of SIL is known. In this SIL, referred to here as a "super-hemispherical" SIL and shown in FIG. 1B, the lens includes a partial spherical section and has an overall lens thickness greater than the r thickness of a hemispherical SIL. The super-hemispherical SIL has a thickness $r(1+1/n)$, where r is the radius of the partial spherical section. A focused spot will be obtained at the base of the lens when the incident rays are converging toward a point located a distance nr below the center of the sphere. The incoming converging rays are refracted at the surface of the partial spherical lens section, resulting in an increased effective incident angle $\theta$. In the super-hemispherical SIL, the NA is increased by a factor of $n^2$, as compared with an increase by a factor of only n in the hemispherical SIL.

In both the hemispherical and super-hemispherical SILs the small spot exists only within the high index of refraction material because the high angle rays will be internally reflected at the base of the SIL. However, these rays can be coupled via their evanescent fields to the optical disk if the disk is placed less than a wavelength distance from the base of the SIL. Thus the SIL can be used to increase the storage capacity of an optical disk by the square of the spot size reduction, but only if the SIL can be kept much closer than one wavelength from the disk.

What is needed is an optical disk drive with a super-hemispherical SIL supported on an air-beating slider that is maintained consistently within one wavelength from the disk and that has a continuous ABS.

SUMMARY OF THE INVENTION

The invention is an optical disk drive with an air-beating slider that is formed of radiation transparent material. The slider has a lens section located on its back side opposite the side with the ABS. The lens section and slider together form a super-hemispherical SIL. In the preferred embodiment the lens section is at least a hemisphere and the lens section and slider are formed of the same material and thus have the same index of refraction, n. The slider ABS is maintained within one wavelength of the surface of the optical disk. The light from the disk drive's light source is focused by the super-hemispherical SIL to a point on the slider ABS. The light is coupled through the air-bearing gap via the evanescent field to the data layer on the optical disk. The focused spot size on the disk data layer is thus reduced by a factor of $n^2$ from what it would otherwise be without the super-hemispherical SIL provided by the radiation transparent slider. The lens section and slider can be formed as an injection-molded single piece of material or can be separate pieces bonded together with an adhesive having a similar index of refraction.

For a fuller understanding of the nature and advantages of the present invention, reference should be made to the following detailed description taken in conjunction with the accompanying figures.

DESCRIPTION OF THE PREFERRED EMBODIMENTS

Prior Art

Figure 2:
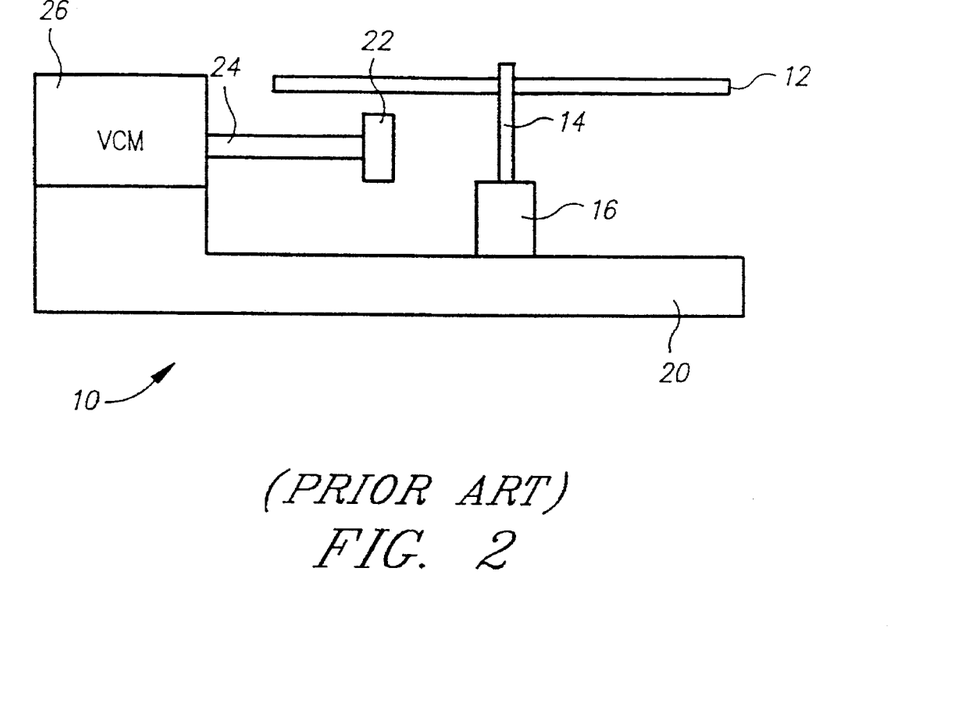
FIG. 2 is a schematic diagram of a prior art optical disk data storage system.

FIG. 2 shows a schematic diagram of an optical disk data storage system designated by the general reference number 10. System 10 includes an optical data storage disk 12 which is preferably removably mounted on a clamping spindle 14 as is known in the art. Spindle 14 is attached to a spindle motor 16, which in turn is attached to a system chassis 20. Motor 16 rotates spindle 14 and disk 12.

An optical head 22 is positioned below disk 12. Head 22 is attached to an arm 24, which in turn is connected to an actuator device such as a voice coil motor (VCM) 26. VCM 26 is attached to chassis 20 and moves arm 24 and head 22 in a radial direction below disk 12.

Figure 3:
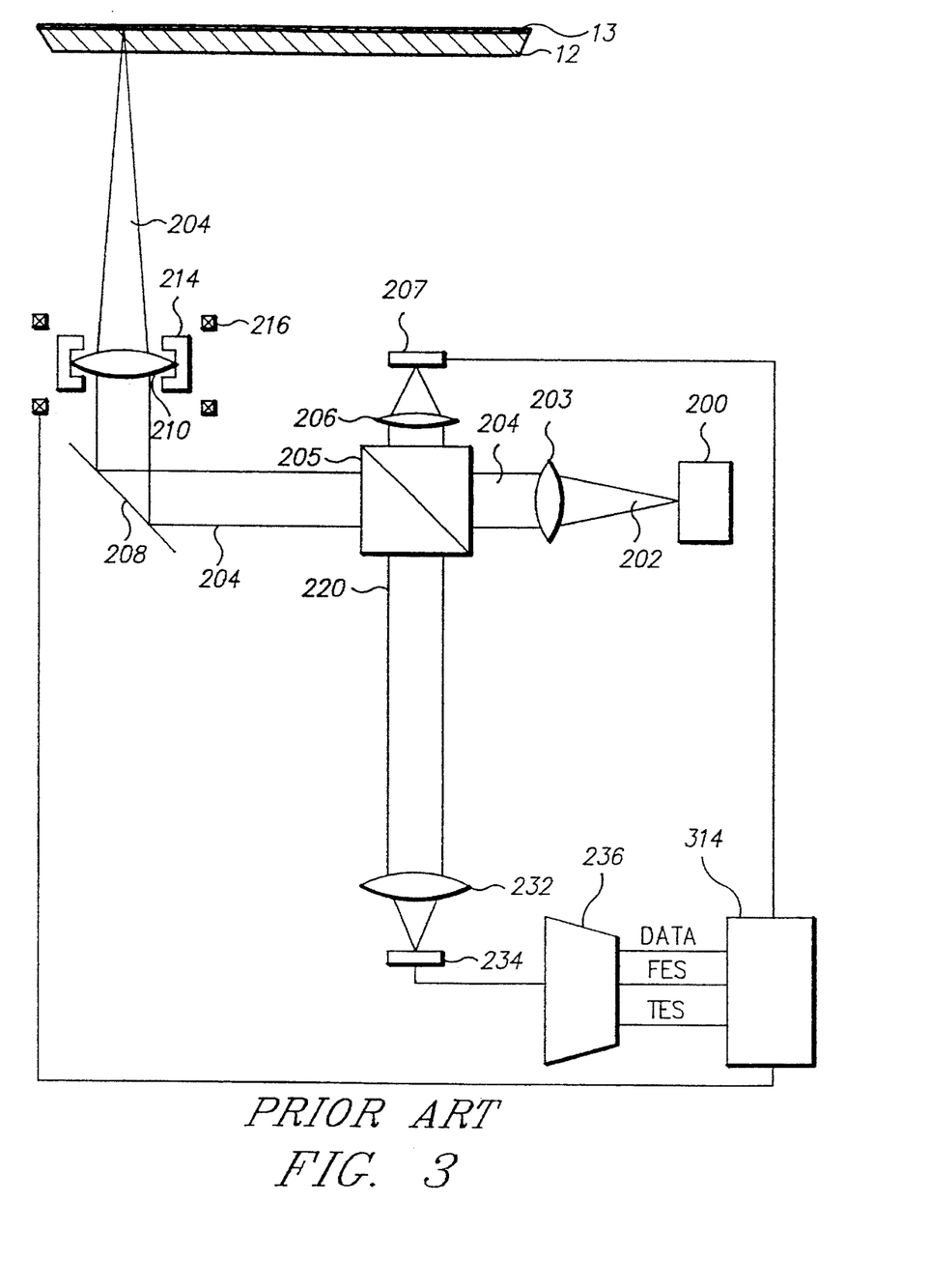
FIG. 3 is a schematic diagram of the prior art system of FIG. 2 illustrating the optical head, laser light source, laser beam path and controller for controlling the system components.

FIG. 3 shows a schematic diagram of one embodiment of the optical head 22 and disk 12 of FIG. 2. Optical head 22 includes a laser diode 200, which may be a gallium-aluminum-arsenide diode laser producing a primary beam of light 202 at a fixed wavelength. Beam 202 is collimated by lens 203 and then passes to a beamsplitter 205. A portion of beam 204 is reflected by beamsplitter 205 to a focus lens 206 and an optical detector 207. Detector 207 is used to monitor the power of laser beam 204. Beam 204 from beamsplitter 205 next passes to and is reflected by a mirror 208. Beam 204 then passes through a focus lens 210 and is focused onto the data layer 13 of disk 12. Lens 210 is mounted in a holder 214, the position of which is adjusted relative to disk 12 by a focus actuator 216, which may also be a voice coil motor.

A portion of the light beam 204 is reflected at the data layer 13 as a reflected beam 220. Beam 220 returns through lens 210 and is reflected by mirror 208. At beamsplitter 205, beam 220 is directed through an astigmatic lens 232 and onto a multi-element optical detector 234. The multi-element detector 234 generates output signals that are amplified by amplifier 236 and used to generate the data signal, the tracking error signal (TES), and the focus error signal (FES), each of which is sent to microprocessor-based disk drive controller 314. The TES may be generated either by reflection of the light beam from grooves in the disk or, in the absence of grooves, by pre-written servo marks, as described by Hurst et al., "Optical Recording at 2.4 Gbit/in$^2$ Using a Frequency Doubled Diode Laser", *Jpn. J. Appl. Phys.* Vol. 32 (1993) pp. 5301–5306.

Controller 314 is also connected to and controls focus actuator 216 and laser 200 (via detector 207). Controller 314 may also be used to control the VCM 26 and spindle motor 16.

Preferred Embodiments

Figure 4:
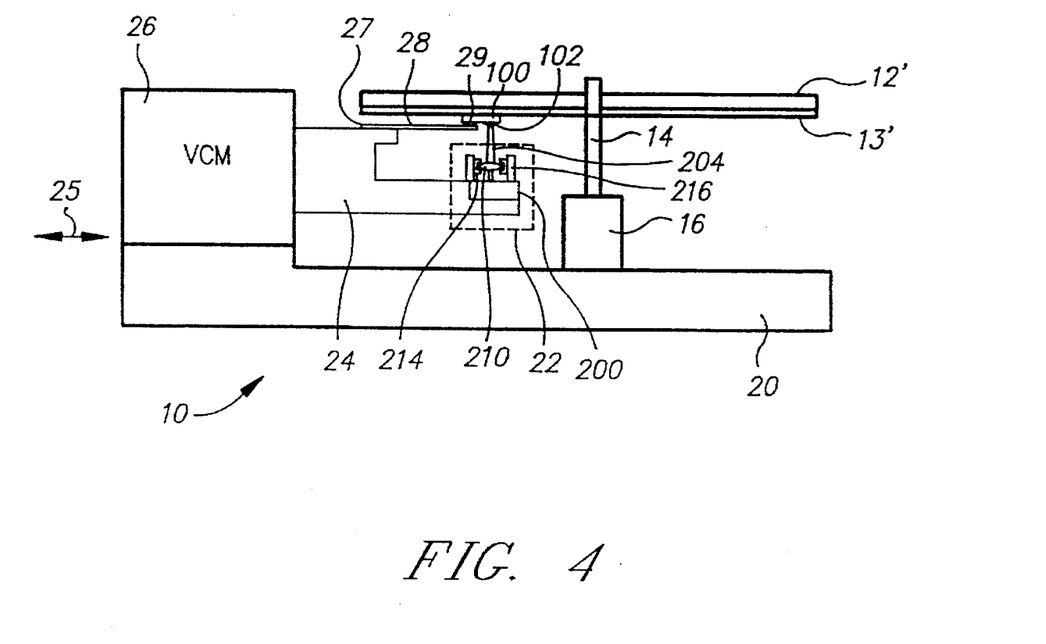
FIG. 4 a schematic diagram of the optical disk data storage system of the present invention.

The optical disk drive according to the present invention is illustrated schematically in FIG. 4. The system is identical to that shown in FIG. 2 with the exceptions that a transparent air-bearing slider 100 with a hemispherical lens section 102 mounted on its back surface is also attached to the actuator arm 24 that also supports optical head 22, and the disk 12' has its data layer 13' on the side near slider 100. The attachment of the slider 100 to arm 24 is by means of a conventional suspension 27 such as that used in rigid magnetic recording disk drives. One such suspension is the well-known Watrous suspension, as described in IBM's U.S. Pat. No. 4,167,765. This suspension includes a load beam 28 with a flexure 29 attached to its end. The slider is attached to the flexure by an epoxy adhesive. The flexure and load beam permit the air-beating slider to pitch and roll as it rides on the air bearing caused by the rotating disk and the ABS of the slider.

The VCM 26 moves the actuator arm 24 in a linear direction (depicted by arrow 25) so that air-bearing slider 100 and optical head 22 move in unison in a radial direction across the surface of optical disk 12. The optical head 22 includes the laser 200, a focus lens 210 supported in lens holder 214, and a focus actuator 216 for moving the lens 210 in a direction generally perpendicular to disk 12'. In this manner the converging beam 204 can be focused through the transparent lens section 102, slider body 100, onto the data layer 13' of the optical disk 12'.

Figure 5:
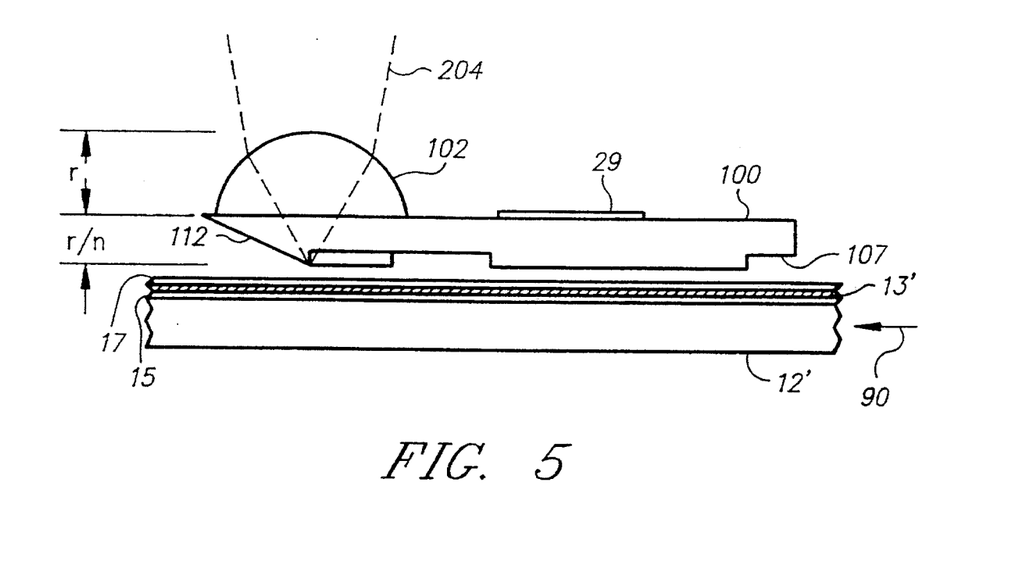
FIG. 5 is a side view illustrating the transparent slider and mounted lens section forming a super-hemispherical SIL in an air-bearing relationship with the optical disk.

Referring now to FIG. 5, the slider 100 is shown in side view in its air-bearing relationship with the surface of disk 12'. The disk 12' is represented as a conventional M-O disk. The M-O disk 12' has a smooth glass substrate onto which is formed a first dielectric layer 15, such as silicon nitride (SIN), a rare earth transition metal (RE-TM) data layer 13' and a second protective dielectric capping layer 17, which may also be SiN. Alternatively, the data layer 13' can be a cobalt-platinum multilayer and the capping layer 17 can be carbon. The capping layer 17 typically has a relatively high index of refraction, i.e., approximately 2.3 for SiN, and a thickness in the range of 10–100 nm. The slider 100 is mounted by an adhesive to the stainless steel flexure 29 that forms part of the suspension 27 (FIG. 4). The adhesive may be an epoxy adhesive, such as 5-minute epoxy available from Devcon, or a cyanoacrylate such as Loctite 410. On the top side, or side opposite the side of the slider 100 facing disk 12', is a hemispherical lens section 102 having a height or thickness r. The radiation transparent slider has a thickness of r/n, where n is the index of refraction of the material used for the lens section 102 and slider 100. Lens section 102 and slider 100 are both formed of material having substantially the same index of refraction. In the preferred embodiment, lens section 102 and slider 100 are formed of glass having an index of refraction n of 1.52, such as BK-7 available from Schott. The lens section 102 is a separate element that is bonded to the top side of slider 100 by an epoxy having an index of refraction matched to that of the lens section and slider. Commercially available adhesive NoA61 from Norland has an index of refraction of 1.56 and is suitable for this bonding. Thus the hemispherical lens section 102 and the body of transparent slider 100 together form a super-hemispherical SIL.

Figure 6:
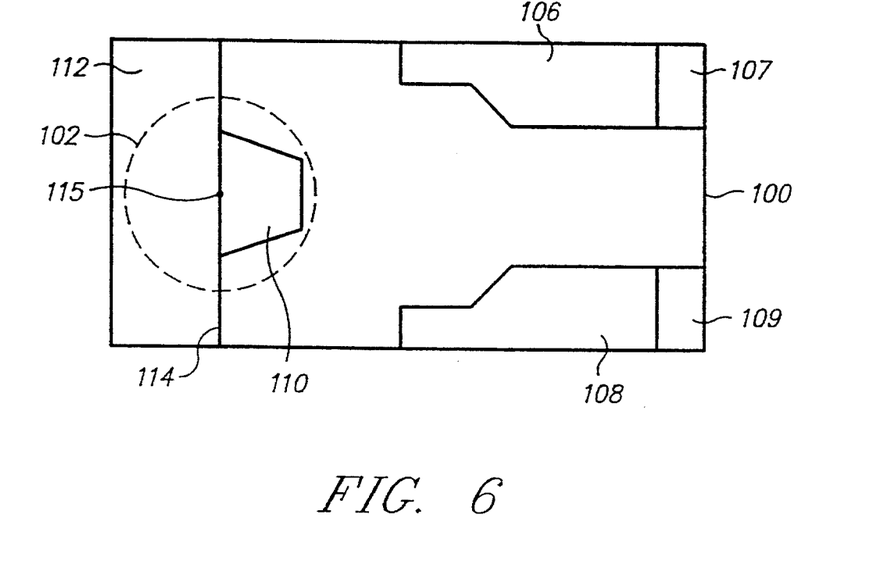
FIG. 6 is a view of the ABS of the transparent slider showing the location of the hemispherical lens section.

FIG. 6 shows the bottom of slider 100 with the air-bearing surface (ABS) that comprises parallel air-bearing rails 106, 108 and rear air-bearing pad 110. Rails 106, 108 have respective steps 107, 109 at the front or leading end of the slider 100 to facilitate the generation of the air bearing as the disk rotates. The slider body is cut from a larger piece of glass using diamond cutting tools and machined to the correct thickness using standard crystal lapping and polishing techniques. The movement of the disk relative to the slider is shown by arrow 90 in FIG. 5. The rear or trailing end of slider 100 has a beveled surface 112. The intersection of the plane defined by beveled surface 112 and the rear air-bearing pad 110 defines a line 114. Line 114 is preferably aligned directly beneath the center of hemispherical lens section 102 or slightly behind it toward the rear of slider 100. The beveled surface 112 enables the slider to be pitched up during operation with the result that the line 114 is essentially the closest portion of slider 100 to disk 12'. The ABS shown in FIG. 6 is a typical design. There are numerous ABS designs that can be used with the present invention. The ABS is formed on the bottom side of the glass by use of a photoresist and etching away of the slider material to leave the air-bearing surfaces 106, 108, and 110. The steps 107, 109 are also formed by the use of a photoresist and etching away of material from the front of the slider. The removal of material from the slider body can be done by conventional techniques such as ion milling, reactive ion etching, or chemical etching. The beveled surface 112 is formed by lapping the slider at the correct angle. The steps 107, 109 are the preferred design at the slider front end to facilitate the formation of the air-bearing during slider operation because of their ease of manufacture, but conventional sloped tapers may also be used in place of the steps.

As shown in FIG. 5, the convergent beam 204 from the optical head 22 (FIG. 4) enters hemispherical lens section 102 and is focused through the radiation transparent lens section 102 and slider 100 to a point 115 on line 114. In the embodiment shown in FIGS. 5 and 6, the radius r of the hemispherical lens section 102 is 0.5 mm, the index of refraction n of the glass used for lens section 102 and slider 100 is 1.5 and thus the thickness of the slider body is $r/n=0.33$ mm. The lens section 102 and the body of transparent slider 100 together form the super-hemispherical SIL. A hemispherical lens section 102 is the preferred shape because of its ease of manufacture. However, the lens section can have the shape of any partial sphere greater or less than a hemisphere provided the total thickness of the lens section and slider body satisfies the relationship of $r(1+1/n)$. Materials with an index of refraction higher than approximately 1.5 can also be used for fabricating the lens section and slider. This is desirable because it allows smaller optical spot sizes to be achieved. Glasses can be obtained with indices of refraction up to approximately 2.0. Materials such as cubic zirconia (n=2.1) and diamond (n=2.4) are also suitable.

In the preferred embodiment the lens section 102 and slider 100 are formed of the same transparent material and have the same identical index of refraction. However, it is possible to form the super-hemispherical SIL so that the lens section and slider are made from different materials, even though this will result in an increase in the focused spot size. The lens section and slider will thus have different indices of refraction. For example, it may be desirable to use a slider material having particular tribological properties and from which a lens section may be difficult to fabricate. In such a case, the total thickness of the super-hemispherical SIL (lens section thickness plus slider thickness) would be only approximately given by $r(1+1/n)$, where n is the index of refraction of the lens section. The precise thickness would instead be calculated from geometric optics to minimize aberration. For example, for a hemispherical lens section of radius 1.0 mm and n=1.84 and a slider material with n=1.85, the total thickness would ideally be 0.782 mm. This thickness is different from a super-hemispherical SIL made entirely of n=1.84 glass, where the thickness would be 0.772 mm.

As an alternative to forming the super-hemispherical SIL by bonding the separate lens section 102 and slider body 100, the lens section and slider and can be formed as an integrated single-piece element machined from a single piece of crystal. Materials such as zinc sulfide (ZnS) and Cleartran, a water-free brand of ZnS available from Morton International, can be deposited by chemical vapor deposition to form thick polycrystalline films. Cleartran has an index of refraction of 2.3 at a wavelength of 500 nm. The lens section 102 and slider 100 are formed by polishing the slider to a thickness equal to the final hemispherical lens section thickness plus the slider body thickness of $r(1+1/n)$. The hemispherical surface of the lens section 102 is then formed by diamond machining a convex surface onto the top of the slider 100. The ABS is formed either by diamond machining or etching. Alternatively, the integrated single-piece lens section and slider can be formed by injection molding a single piece of transparent material such as commercially available polycarbonate.

Figure 7:
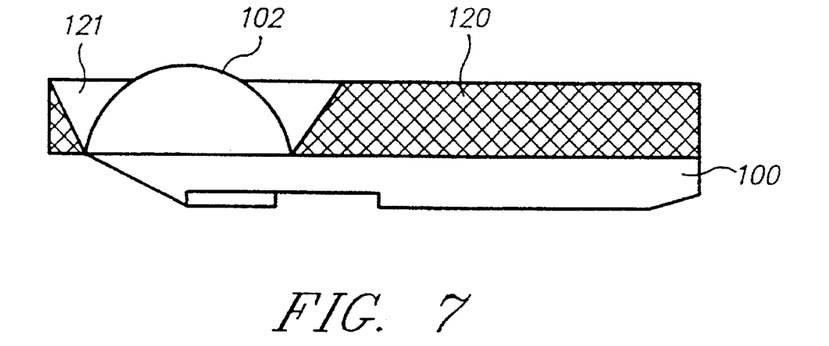
FIG. 7 is a side view of the transparent slider with a backing plate for stiffening the slider.

In certain cases, depending upon the desired lens section spherical geometry and index of refraction, the slider thickness of $r/n$ may be quite thin. To improve the strength and rigidity of the slider, it may be desirable to use a thicker slider body. Such an embodiment is shown in FIG. 7 where the slider 100 has a bonded backing plate 120. The backing plate 120 is formed from a silicon wafer. The silicon plate has pyramidal etch pits defined in the conventional manner, which result in square holes. The hemispherical lens section 102 is inserted into one of the holes 121 in the silicon backing plate 120. The sides of the holes are automatically sloped due to the anisotropic etching process of silicon, thereby allowing the light access to the lens section 102. Alternatively, the backing plate 120 may be formed from the same type of glass as the slider body using standard glass cutting and polishing techniques.

A focused spot of light from the super-hemispherical SIL reaches the data layer 13' on optical disk 12' (FIG. 5) because of coupling with the evanescent field. Evanescent field coupling is a well known optical phenomenon. In the absence of a second high index of refraction surface close to the base of the super-hemispherical SIL, light rays reaching the base at angles greater than the "critical" angle will undergo total internal reflection within the SIL. The critical angle is given by $\theta=\sin^{-1}(1/n)$. This angle is 41.8 degrees for n=1.5. All of the optical energy incident at angles greater than this angle will be carried away by the internally reflected light beam. However, even though this light is internally reflected there is an electric field associated with it that is transmitted. The amplitude of this transmitted electric field decays exponentially from the SIL base and reaches essentially zero within a few wavelengths. This field is referred to as the evanescent field associated with the light internally reflected within the SIL. By bringing the surface of another high index of refraction material, preferably with the same index of refraction as the SIL, close to the SIL base, the evanescent field can be coupled into the second surface. The incident beam will now no longer be internally reflected within the SIL. Instead light incident at all angles will be transmitted and will propagate within the second high index of refraction material. Optical energy will then be transmitted across the air gap between the base of the SIL and the disk. The focused beam will then contain light at all the angles and the focused spot size will be essentially the same as if there were no air gap.

The theoretical spacing between point 115 and disk 12' (FIG. 5) must be less than one wavelength for the surface of disk 12' to couple with the evanescent field from point 115 on the slider ABS. Preferably the disk should be located close enough to the SIL base (the ABS of the slider) so that the evanescent field is still above 1/e of its initial value. For typical values of n=1.5 and a focusing objective having NA=0.5, the disk should be located closer than 0.25 wavelengths from the SIL base. Typical laser wavelengths in optical recording are in the range of 480–820 nm, so that air gaps in the range of 120–205 nm or less are preferred. In the present invention, the load applied to the slider by the load beam of the suspension, the design of the ABS and the rotational speed of the disk can be theoretically or experimentally determined to assure that the spacing between the surface of disk 12' and the focal point 115 of the super-hemispherical SIL is maintained less than this critical distance. ABS-disk spacings or "flying heights" in the range of 30–50 nm are readily achievable in magnetic recording disk drives.

In the embodiment shown in FIG. 4 and described relative to FIGS. 5 and 6, a focus servo system is required to maintain the focus lens 210 for focusing the convergent beam 204 onto the hemispherical lens section 102. This is because the spacing between the focus lens 210 and the slider 100 will vary as the slider 100 moves in a vertical direction following the vertical runout of the rotating disk 12'.

Figure 8:
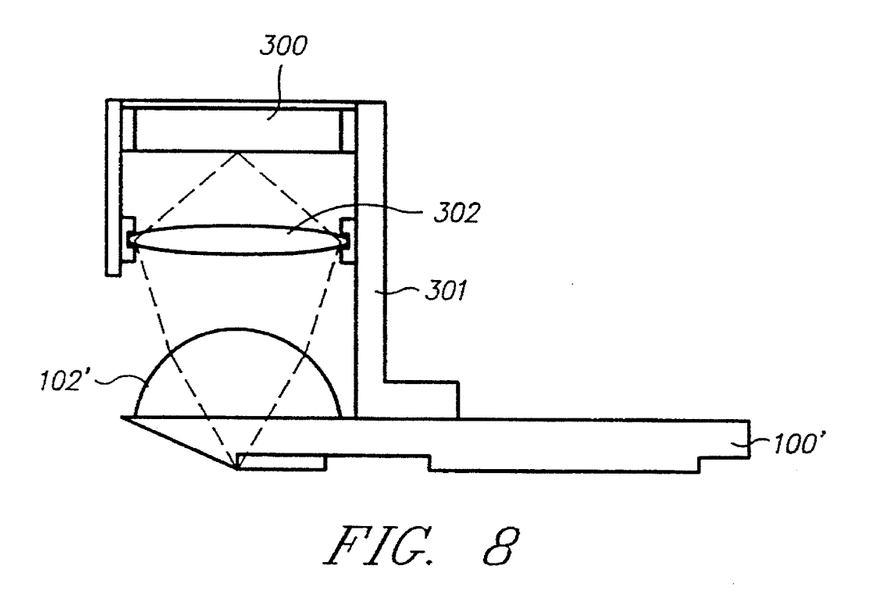
FIG. 8 is an embodiment of the present invention with the laser light source mounted on the transparent slider.

It is possible to avoid the need for a focus servo and a movable focus lens by placement of the laser and the focus lens directly on the slider. Such an embodiment is shown in FIG. 8. A laser diode and photodetector assembly 300 is mounted on the slider 100' above the lens section 102'. The assembly 300 is held in place on slider 100' by support 301. A separate focusing objective lens 302 is located between assembly 300 and lens section 102' such that the diverging beam emitted from the laser is focused onto the base of the super-hemispherical SIL (the ABS of slider 102'). Since the distance between the disk and the focusing objective lens 302 is fixed by the fly height of the slider, there is no need for a focus servo or actuator. Data is detected by changes in the disk reflectivity by the photodetector in assembly 300. The focusing objective lens 302 could also be a Fresnel zone lens or grating. Such gratings typically have low NA and thus can not focus a light bean to a small spot size. However, by using a SIL in conjunction with the grating, this disadvantage can be overcome. Thus the laser diode and photodetector assembly 300 can be integrated with the grating to eliminate the need for a separate focusing objective lens 302. Such an integrated optic system is described by Nishihara et al., "Integrated-Optic Disc Pickups", *SPIE Vol,* 1663 *Optical Data Storage* (1992) pp. 26–36.

Figure 9:
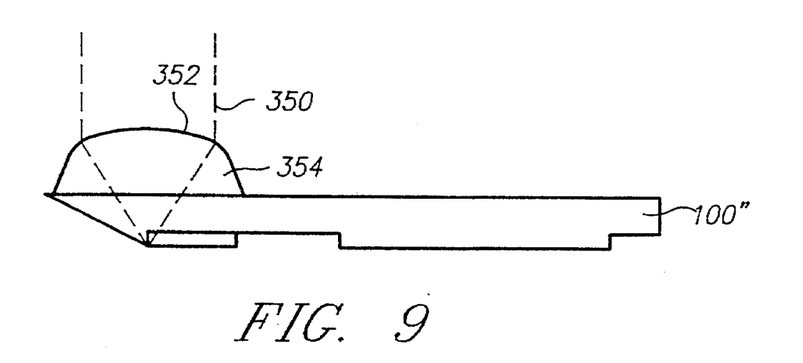
FIG. 9 is an embodiment of the present invention with an aspherical lens section and transparent slider that receive a collimated light beam.

Another embodiment that avoids the need for a separate focus lens and focus servo is one that uses a super-hemispherical SIL with an aspherical surface. In this embodiment, as shown in FIG. 9, a collimated light beam 350 enters the aspherical surface 352 of lens section 354. Lens section 354 is bonded to the top of slider 100''. The collimated beam 350 is focused internally within the super-hemispherical SIL formed of lens section 354 (with aspherical surface 352) and the body of slider 100''. The SIL has a flat side, which is the ABS of slider 100'', and a rounded aspherical side that is the upper surface of lens section 354. The shape of the aspherical surface is designed so that all rays incident on the lens section 354 in a direction parallel to the principal axis are refracted to one point on the ABS of slider 100''. This requirement, plus the requirement that each ray obey Snell's law of refraction, is sufficient to allow the particular required aspherical shape to be determined numerically. Once the shape is determined, a precision mold is made. A molded glass lens is then be made from the mold, or the lens can be injection molded out of a material such as polycarbonate. In this type of super-hemispherical SIL, even though the surface of the lens section 354 is only approximately a partial sphere, the thickness of the lens section 354 can be represented by r, where r is the radius of curvature of the lens section on the principal axis directly above the focus point.

The embodiment shown in FIG. 9 can also be combined with a variation of the embodiment shown in FIG. 8. The separate lens 302 is removed from the embodiment of FIG. 8 and the lens section 102' is replaced with aspherical lens section 354. In this embodiment the lens 354 would be designed to focus the diverging beam from the laser assembly 300, rather than the collimated beam 350 shown in FIG. 9.

While the preferred embodiments of the present invention have been illustrated in detail, it should be apparent that modifications and improvements may be made to the invention without departing from the spirit and scope of the invention as described in the following claims.

What is claimed is:

1. An optical data storage system comprising:

an optical disk having a data layer;

a motor for rotating the disk;

a light source;

a slider made of material transparent to radiation at the wavelength of the light source and having an air-bearing surface on the side of the slider facing the disk for generating an air-bearing between the slider and the disk during rotation of the disk;

an actuator for moving the slider generally radially across the disk;

a suspension connecting the slider to the actuator for maintaining the slider near the disk during rotation of the disk; and a lens section located on the back side of the slider opposite the side facing the disk, the lens section being in the shape of a partial sphere and made of material transparent to radiation at the wavelength of the light source, and wherein the total thickness of the lens section and the slider is approximately equal to r(1+1/n), where r is the radius of the partial spherical lens section and n is the index of refraction of the lens section.

2. The system according to claim 1 wherein the lens section and the slider have substantially the same index of refraction.

3. The system according to claim 1 wherein the lens section is a hemisphere and the slider has a thickness approximately equal to fin.

4. The system according to claim 1 further comprising an adhesive between the lens section and the back side of the slider for bonding the lens section to the slider, the adhesive having an index of refraction substantially the same as that of the lens section.

5. The system according to claim 1 wherein the lens section and the slider are an integrated single-piece structure formed from a single piece of material.

6. The system according to claim 5 wherein the lens section and the slider are formed of injected-molded plastic material.

7. The system according to claim 1 wherein the trailing end of the slider is beveled and wherein the focal point of the light within the slider is located approximately at the intersection of the beveled surface and the air bearing surface.

8. The system according to claim 1 further comprising a backing plate located on the back side of the slider.

9. The system according to claim 8 wherein the backing plate is formed from silicon.

10. The system according to claim 1 further comprising a focus lens located between the light source and the slider for converging the light from the source to the lens section.

11. The system according to claim 10 further comprising a focus actuator connected to the focus lens for focusing the focus lens.

12. The system according to claim 11 wherein the focus lens and the focus actuator are connected to the actuator for moving the slider radially across the disk, whereby the focus lens and focus actuator move radially in unison with the slider.

13. The system according to claim 1 further comprising means for collimating the light from the source and wherein the lens section has an aspherical surface for converging the collimated light beam.

14. The system according to claim 1 wherein the light source is attached to the slider.

15. The system according to claim 14 wherein the light source generates a diverging light beam and wherein the lens section has an aspherical surface for converging the diverging beam.

16. An optical data storage system comprising:
an optical disk having a data layer;
a motor for rotating the disk;
a light source;
a slider made of material transparent to radiation at the wavelength of the light source and having an air-bearing surface on the side of the slider facing the disk for generating an air-bearing between the slider and the disk during rotation of the disk;
an actuator for moving the slider generally radially across the disk;
a suspension connecting the slider to the actuator for maintaining the slider near the disk during rotation of the disk; and
a lens section having a partial spherically shaped surface and located on the back side of the slider opposite the side facing the disk, the lens section having substantially the same index of refraction as that of the radiation transparent slider, the total thickness of the lens section and the slider being approximately equal to $r(1+1/n)$, where r is the radius of the partial spherical lens section and n is the index of refraction of the lens section and slider.

17. The system according to claim 16 wherein the lens section is a hemisphere and the slider has a thickness approximately equal to $r/n$.

18. The system according to claim 16 wherein the lens section is greater than a hemisphere.

19. The system according to claim 16 wherein the lens section has a flat surface and further comprising an adhesive between the flat surface of the lens section and the back side of the slider for bonding the lens section to the slider, the adhesive having an index of refraction substantially the same as that of the lens section and slider.

20. The system according to claim 16 wherein the lens section and the slider are an integrated single-piece structure formed from a single piece of material.

21. The system according to claim 20 wherein the lens section and the slider are formed of injected-molded plastic material.

22. The system according to claim 16 wherein the trailing end of the slider is beveled and wherein the focal point of the light within the slider is located approximately at the intersection of the beveled surface and the air bearing surface.

23. The system according to claim 16 further comprising a backing plate located on the back side of the slider.

24. The system according to claim 23 wherein the backing plate is formed from silicon.

25. The system according to claim 16 further comprising a focus lens located between the light source and the slider for converging the light from the source to the lens section.

26. The system according to claim 25 further comprising a focus actuator connected to the focus lens for focusing the focus lens.

27. The system according to claim 26 wherein the focus lens and the focus actuator are connected to the actuator for moving the slider radially across the disk, whereby the focus lens and focus actuator move radially in unison with the slider.

28. The system according to claim 16 wherein the light source is attached to the slider.

29. The system according to claim 28 wherein the light source generates a diverging light beam and wherein the lens section has an aspherical surface for converging the diverging beam.

30. The system according to claim 28 wherein the light source generates a diverging light beam and further comprising a focus lens located between the light source and the lens section for converging the diverging beam.

31. A slider assembly for use in an optical disk drive comprising:
a slider body made of material transparent to light at the wavelength of the optical disk drive's light source and having an air-bearing surface on the side of the slider facing the optical disk;
a lens section having a partial spherically shaped surface and located on the back side of the slider opposite the side facing the disk, the lens section having substantially the same index of refraction as that of the light transparent slider, the total thickness of the lens section and the slider being approximately equal to $r(1+1/n)$, where r is the radius of the partial spherical lens section and n is the index of refraction of the lens section and slider.

32. The system according to claim 31 wherein the lens section is a hemisphere and the slider body has a thickness approximately equal to $r/n$.

33. The system according to claim 31 wherein the lens section is greater than a hemisphere.

34. The system according to claim 31 wherein the lens section has a flat surface and further comprising an adhesive between the flat surface of the lens section and the back side of the slider body for bonding the lens section to the slider body, the adhesive having an index of refraction substantially the same as that of the lens section and slider body.

35. The system according to claim 31 wherein the lens section and the slider body are an integrated single-piece structure formed from a single piece of material.

36. The system according to claim 35 wherein the lens section and the slider body are formed of injected-molded plastic material.

37. The system according to claim 31 wherein the trailing end of the slider body is beveled and wherein the focal point of the light within the slider body is located approximately at the intersection of the beveled surface and the air beating surface.

38. The system according to claim 31 further comprising a backing plate located on the back side of the slider body.

39. The system according to claim 38 wherein the backing plate is formed from silicon.

* * * * *

UNITED STATES PATENT AND TRADEMARK OFFICE
CERTIFICATE OF CORRECTION

PATENT NO. : 5,497,359
DATED : March 5, 1996
INVENTOR(S) : Harry J. Mamin et al.

It is certified that error appears in the above-indentified patent and that said Letters Patent is hereby corrected as shown below:

Title page;
[73] Assignee: "National Business Machines Corporation, N.Y."
should read:
--International Business Machines Corporation, Armonk, N.Y.--

In the Abstract, line 1, "air-beating" should read --air-bearing--.

Column 2, line 39, "air-beating" should read --air-bearing--.

Signed and Sealed this

Thirtieth Day of July, 1996

Attest:

BRUCE LEHMAN

Attesting Officer    Commissioner of Patents and Trademarks